United States Patent [19]

Okamoto et al.

[11] Patent Number: 5,901,126
[45] Date of Patent: May 4, 1999

[54] DISK REPRODUCING APPARATUS HAVING A DISK DIAMETER DETERMINING FUNCTION

[75] Inventors: Naruhiro Okamoto; Hitoshi Sahai; Hiroyuki Maeda, all of Kyoto, Japan

[73] Assignee: Rohm Co. Ltd., Kyoto, Japan

[21] Appl. No.: 08/882,028

[22] Filed: Jun. 25, 1997

Related U.S. Application Data

[62] Division of application No. 08/496,624, Jun. 29, 1995, Pat. No. 5,696,744.

[30] Foreign Application Priority Data

Jun. 30, 1994 [JP] Japan ................................... 6-149016

[51] Int. Cl.$^6$ ....................................................... G11B 7/00
[52] U.S. Cl. ................................................................ 369/58
[58] Field of Search ............................... 369/44.25, 44.27, 369/44.28, 53, 54, 58

[56] References Cited

U.S. PATENT DOCUMENTS 4,868,805  9/1989  Hanami et al. ............................ 369/53

*Primary Examiner*—W. R. Young
*Attorney, Agent, or Firm*—Nikaido Marmelstein Murray & Oram, LLP

[57] ABSTRACT

A reproducing head is moved by a moving stand along the diameter at a constant speed. At this time, an in-focus detecting circuit waits until the cancellation of the focus control. The time to the cancellation of the focus control is counted by a microprocessor. Based on the time, the microprocessor discriminates the radius of an information recorded disk.

1 Claim, 14 Drawing Sheets

DISK REPRODUCING APPARATUS HAVING A DISK DIAMETER DETERMINING FUNCTION

This is a division of application Ser. No. 08/496,624, filed Jun. 29, 1995, now U.S. Pat. No. 5,696,744.

BACKGROUND OF THE INVENTION

1. Field of the Invention

The present invention relates to an information recorded disk reproducing apparatus suitable for reproducing optical disks, in particular, optical disks having the same format and different diameters.

2. Description of the Prior Art

As optical disks having the same format and different diameters, the following three types have already been on the market as common ones:

(i) laser disks (LDs) with diameters of 20 cm and 30 cm;

(ii) compact disks (CDs) with diameters of 8 cm and 12 cm; and (iii) magneto optical disks with diameters of 3.5 inches and 5.25 inches.

Of these disks, the magneto optical disks are put in cases called cartridges having different diameters, so that it is mechanically impossible to reproduce magneto optical disks of different diameters with the same apparatus. However, with respect to the LDs and CDs, the mediums themselves are designed to be directly touched by the user and their reproducing apparatuses do not have any mechanical limitations in reproducing disks of different diameters.

Therefore, unless the diameter is discriminated by some kind of electric means, there caused problems in operating the reproducing apparatus. For example, since disks having different diameters as mentioned above have different moments of inertia, unless the control gain of a motor for rotating the optical disk is changed according to the diameter, an appropriate gain is not obtained for the margin of gain of the motor controlling system In the worst case, a defect such as hunting is caused.

To avoid such a problem, conventionally, a processing such as changing the gain of the motor controlling system is performed by discriminating the diameter of the optical disk by the following methods:

A first method is such that a reflection type optical sensor such as a photocoupler is arranged at a position outside of the radius of a smaller optical disk when the optical disk is attached to the motor to discriminate the diameter based on the presence/absence of reflected light.

A second method is such that the diameter is discriminated based on the length of the total recording time recorded on an innermost area of the optical disk called a table of contents (TOC).

A third method is such that the optical disk is driven at a constant torque to discriminate the diameter by counting the activation time required for the number of rotations to reach a predetermined value.

A fourth method is such that the diameter is discriminated by a combination of the second and third methods.

However, these conventional methods have the following defects:

According to the first method, an extra part such as the photocoupler is necessary for discriminating the diameter, which leads to an increase in cost. Moreover, since the size of the apparatus increases because of the attachment of the extra part, the reduction in size cannot be realized.

According to the second method, the discrimination is impossible when work or a program of a short recording time is recorded on a disk of a large diameter.

According to the third method, since the user touches the medium itself as described above when an LD or a CD is reproduced, when the motor controlling system is confused by finger-prints or flaws, the activation requires a long time even when a disk of a small diameter is reproduced, so that a mis-discrimination may occur. When a frequency generator is attached to the motor to directly monitor the number of rotations, the frequency generator is an obstacle to the reduction in size and cost like the first method.

According to the fourth method, the defects of the second and third methods are compounded.

SUMMARY OF THE INVENTION

An object of the present invention is to provide an information recorded disk reproducing apparatus where no extra part is necessary and no mis-operation occurs.

To achieve the above-mentioned object, an information recorded disk reproducing apparatus of the present invention is provided with: a reproducing head which irradiates a light beam to an optically reproducible information recorded disk to receive a light beam reflected by the disk; transporting means for moving the reproducing head to an innermost portion or an outermost portion of the information recorded disk in advance at a time of activation and then moving the reproducing head along a diameter of the information recorded disk at a predetermined constant speed; discriminating means for receiving an output of the reproducing head to sense that a level of the output has exceeded a predetermined value, the discriminating means outputting a discrimination signal in accordance with presence/absence of the light beam reflected by the information recorded disk; counting means for counting a time from the movement of the reproducing head at the constant speed to the output of the discrimination signal; and means for discriminating a radius of the information recorded disk in accordance with an output value of the counting means.

According to these features, for example in a CD reproducing apparatus, when the reproducing head is moved outward from the innermost portion, the discrimination signal is output in accordance with the presence/absence of the light reflected by the CD, so that the disk is determined to be an 8 cm CD when the time to the termination of the discrimination. signal is short and to be a 12 cm CD when the time is long.

When the reproducing head is moved inward from the outermost portion, the disk is determined to be a 12 cm CD when the time to the output of the discrimination signal is short and to be an 8 cm CD when the time is long.

Moreover, an information recorded disk reproducing apparatus of the present invention is provided with: a reproducing head which irradiates a light beam to an optically reproducible information recorded disk to receive a light beam reflected by the disk; transporting means for moving the reproducing head to an innermost portion or an outermost portion of the information recorded disk in advance at a time of activation and then moving the reproducing head along a diameter of the information recorded disk at a predetermined constant speed; means for receiving an output of the reproducing head to sense that a level of the output has exceeded a predetermined value, the means outputting a discrimination signal in accordance with presence/absence of the light beam reflected by the information recorded disk; first counting means for counting a time from the movement of the reproducing head at the constant speed to the output of the discrimination signal; second counting means for starting a next counting operation after a completion of the counting by the first counting means to count a time required for the reproducing head to reach an end; and means for discriminating a radius of the information recorded disk in accordance with a ratio between an output value of the second counting means and an output value of the first counting means.

According to these features, when the reproducing head is moved outward from the innermost portion, the discrimination signal is output in accordance with the presence/absence of the light reflected by the CD, so that the disk is determined to be an 8 cm CD when the period of time during which the discrimination signal is being output and the time required for the reproducing head to reach the end of its movable range after the termination of the discrimination are short and to be a 12 cm CD when the times are long.

Moreover, an information recorded disk reproducing apparatus of the present invention is provided with: a reproducing head which irradiates a light beam to an optically reproducible information recorded disk on which substantially concentric tracks are recorded, the reproducing head receiving a light beam reflected by the disk; means for receiving an output of the reproducing head to output a track crossing signal every time the reproducing head crosses the track; transporting means for moving the reproducing head to an innermost portion or an outermost portion of the information recorded disk in advance at a time of activation and then moving the reproducing head along a diameter of the information recorded disk at a predetermined constant speed; counting means for counting the number of track crossing signals; and means for discriminating a radius of the information recorded disk in accordance with an output value of the counting means.

According to these features, the reproducing head is moved outward from the innermost portion of the CD to count the number of information tracks recorded on the CD which the reproducing head crosses. The disk is determined to be an 8 cm CD when the number of tracks is small and to be a 12 cm CD when the number of tracks is large.

Moreover, an information recorded disk reproducing apparatus of the present invention is provided with: a reproducing head which irradiates a light beam to an optically reproducible information recorded disk to receive a light beam reflected by the disk; transporting means for moving the reproducing head to an innermost portion or an outermost portion of the information recorded disk in advance at a time of activation and then moving the reproducing head to a predetermined position along a diameter of the information recorded disk; means for receiving an output of the reproducing head to sense that a level of the output has exceeded a predetermined value, the means outputting a discrimination signal in accordance with presence/absence of the light beam reflected by the information recorded disk; and means for discriminating a radius of the information recorded disk in accordance with the discrimination signal.

According to these features, the reproducing head is moved to a position corresponding to the outermost portion of an 8 cm CD and when the light reflected by the CD is present at that position, a discrimination signal representing whether focus control is performed or not is output, so that the disk is determined to be a 12 cm CD when the discrimination signal is outputted and to be an 8 cm CD when no discrimination signal is output.

As described above, since the radius of the CD is discriminated by determining whether focus control is performed or not, no cost-increasing extra part is necessary to detect the radius. As a result, the reduction in cost and size is easily achieved.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED

Hereinafter, embodiments of the present invention will be described with reference to the drawings.

Figure 1:
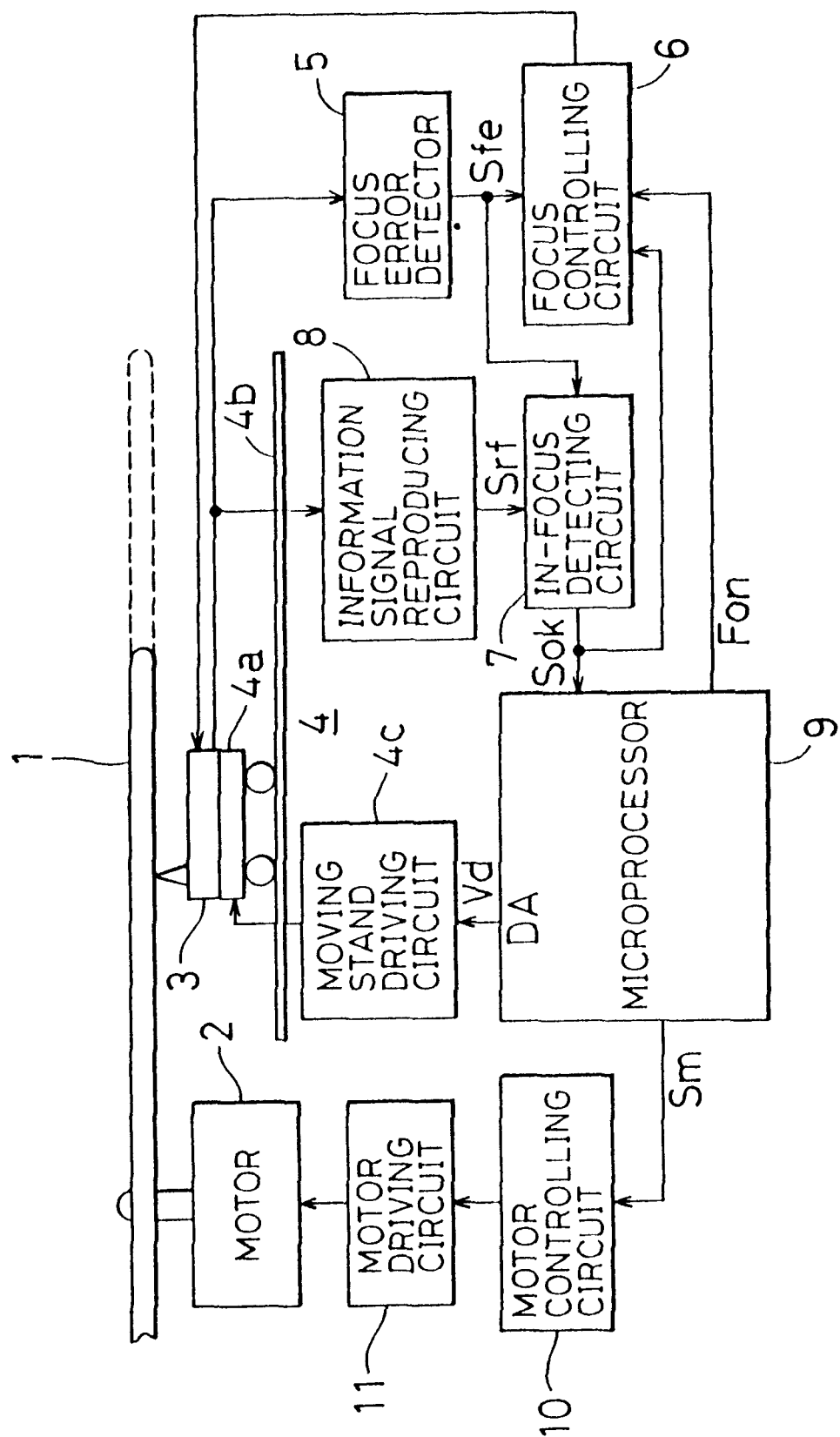
FIG. 1 is a schematic block diagram of an information recorded disk reproducing apparatus of a first embodiment of the present invention.

Referring to FIG. 1, there is shown a schematic block diagram of an information recorded disk reproducing apparatus of a first embodiment of the present invention. First, peripheral hardware of this embodiment will be described. In FIG. 1, reference numeral 1 represents an optically reproducible information recorded disk. In this embodiment, a compact disk (CD) is used as an example. Reference numeral 2 represents a motor to rotate the CD. The motor 2 is supplied with a constant voltage by a motor controlling circuit 10 and a motor driving circuit 11 to rotate the disk at a constant speed. A motor activating signal Sm serving as the trigger is transmitted from a microprocessor 9.

Reference numeral 3 represents a reproducing head which is mechanically joined with a moving stand 4a. The moving stand 4a is arranged on a rail 4b which guides the stand 4a so as to be movable. Thereby, the reproducing head 3 is movable along the diameter of the CD 1. To the moving stand 4a, a voice coil motor type driving actuator (hereinafter, referred to as VCM) is attached. The VCM is controlled by a moving stand driving circuit 4c. A driving command voltage Vd of that time is generated by a digital-to-analog converter (hereinafter, referred to as D/A) incorporated in the microprocessor 9 and output from an output port DA thereof The moving stand 4a, the rail 4b and the moving stand driving circuit 4c constitute a transporting means 4.

Figure 2:
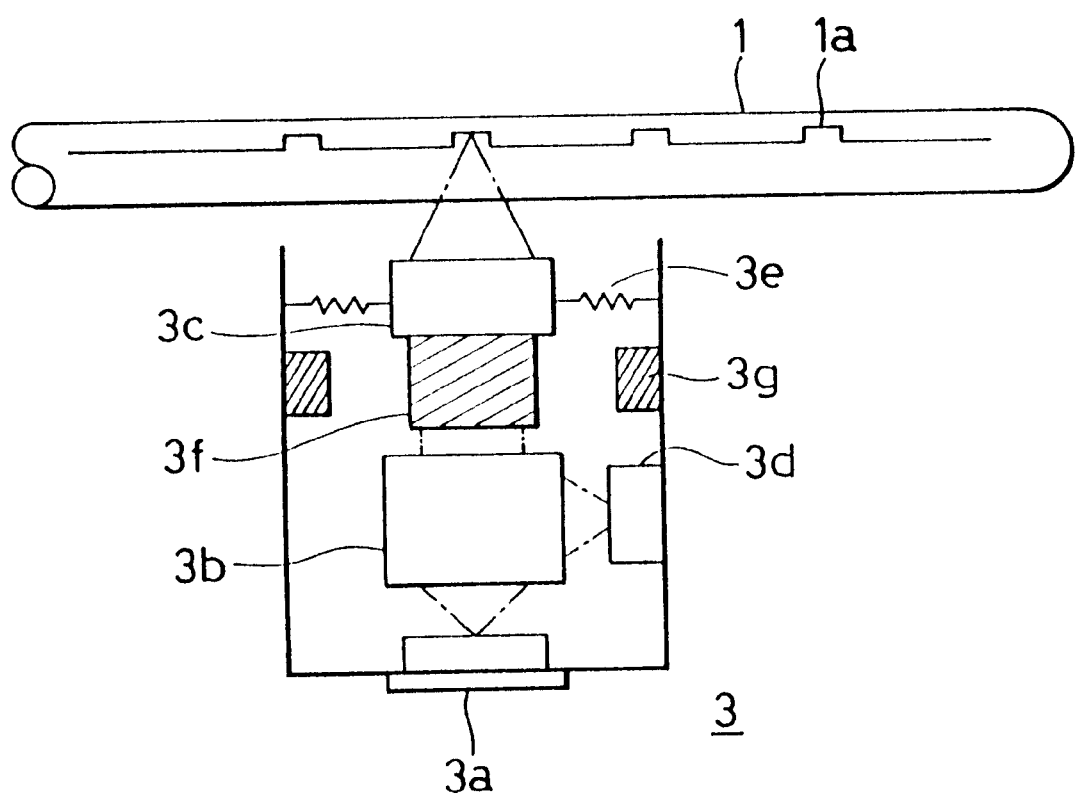
FIG. 2 shows the structure of a reproducing head of the first embodiment.

The reproducing head 3 is structured as shown in FIG. 2. Infrared light from a semiconductor laser 3a is irradiated to an objective lens 3c through an optical system 3b including a collimator lens and a beam splitter The infrared light thus irradiated is, when reflected by the CD 1, incident on a photodiode 3d through the objective lens 3c and the optical system 3b and detected as a photoelectric current lo. The objective lens 3c is held by a damper 3e and supplied with an electromagnetic force in a magnetic field generated by a permanent magnet 3g by activating a coil 3f. The reproducing head 3 will not be described in more detail since various types of reproducing heads have been proposed and well-known.

The photoelectric current Io is transmitted to a focus error detector 5 to be converted into a focus error signal Sfe and is transmitted to a focus controlling circuit 6 and an in-focus detecting circuit 7. The output level of the focus error signal Sfe varies according to the distance between the objective lens 3b and the CD 1 as shown in (a) of FIG. 3, and is called a sigmoid curve from its configuration. The output level of the focus error signal Sfe is 0 when the CD 1 is absent since the case where the CD 1 is absent is equivalent to the case where the CD 1 is present at infinity on the sigmoid curve.

The output of the reproducing head 3 is also transmitted to an information signal reproducing circuit 8 and read out from information tracks (not shown) on the CD 1 as a high-frequency signal Srf including information. The signal Srf has a waveform as shown in (b) of FIG. 3 and is amplified and transmitted to the in-focus detecting circuit 7.

Figure 3:
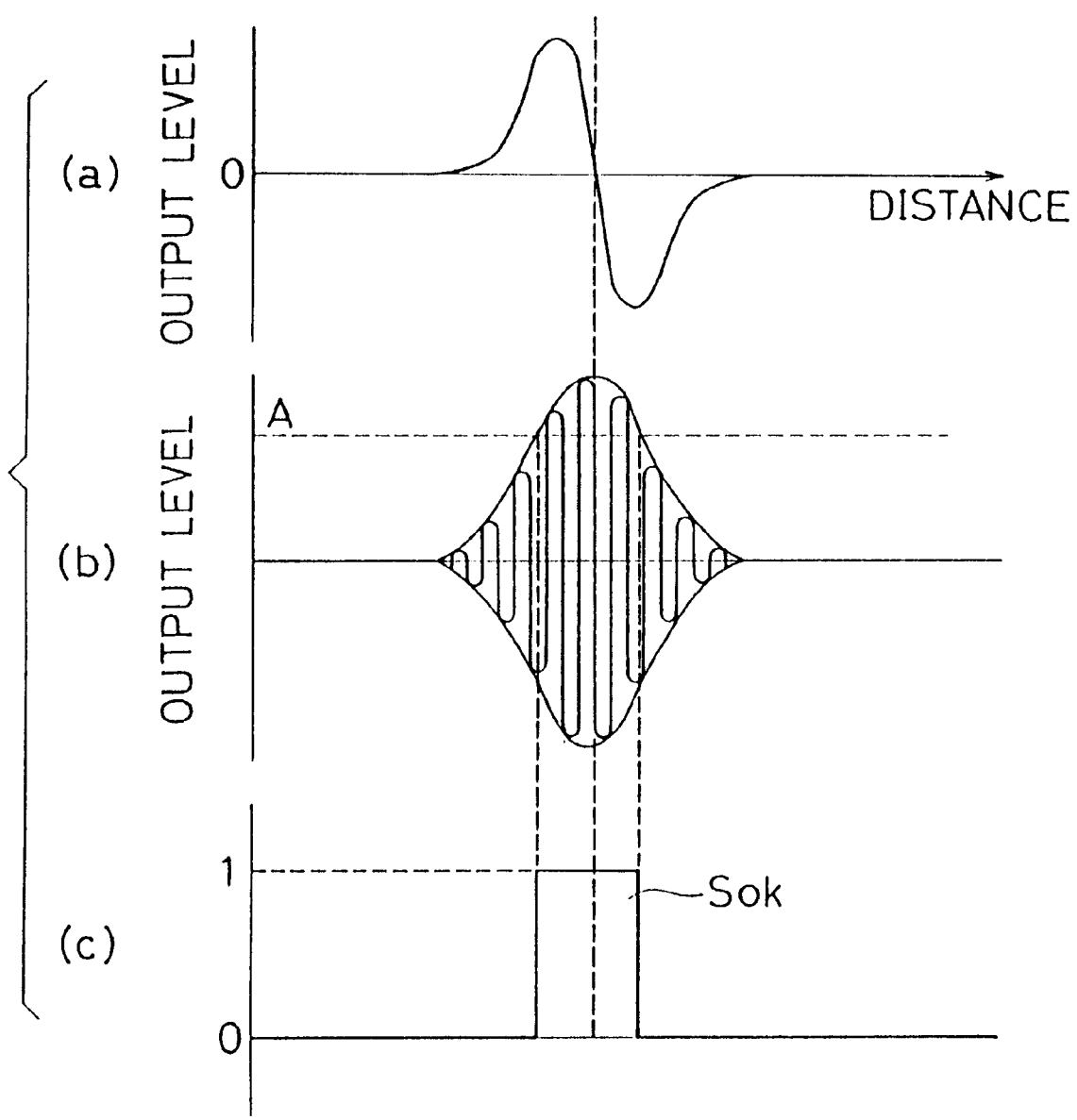
FIG. 3(a–c) shows waveforms of a focus error signal and a high-frequency signal of the first embodiment.

After its absolute value is obtained by the in-focus detecting circuit 7, the high-frequency signal Srf is envelope-detected, and a discrimination signal Sok as shown in (c) of FIG. 3 is output which represents that in-focus state is obtained when the amplitude value is a predetermined level A or higher. The discrimination signal Sok is transmitted to the microprocessor 9. The discrimination signal Sok is also transmitted to the focus controlling circuit 6. When the logic state of the signal Sok is 0, the objective lens 3b is moved upward and downward by an oscillation such as a triangular or a sawtooth oscillation to search for an in-focus position. This is triggered by a focus control start command Fon outputted from the microprocessor 9. When the logic state of the signal Sok becomes "1", a loop filter (not shown) of the focus controlling circuit 6 is activated so as to follow the upward and downward movement of the CD 1.

Figure 4:
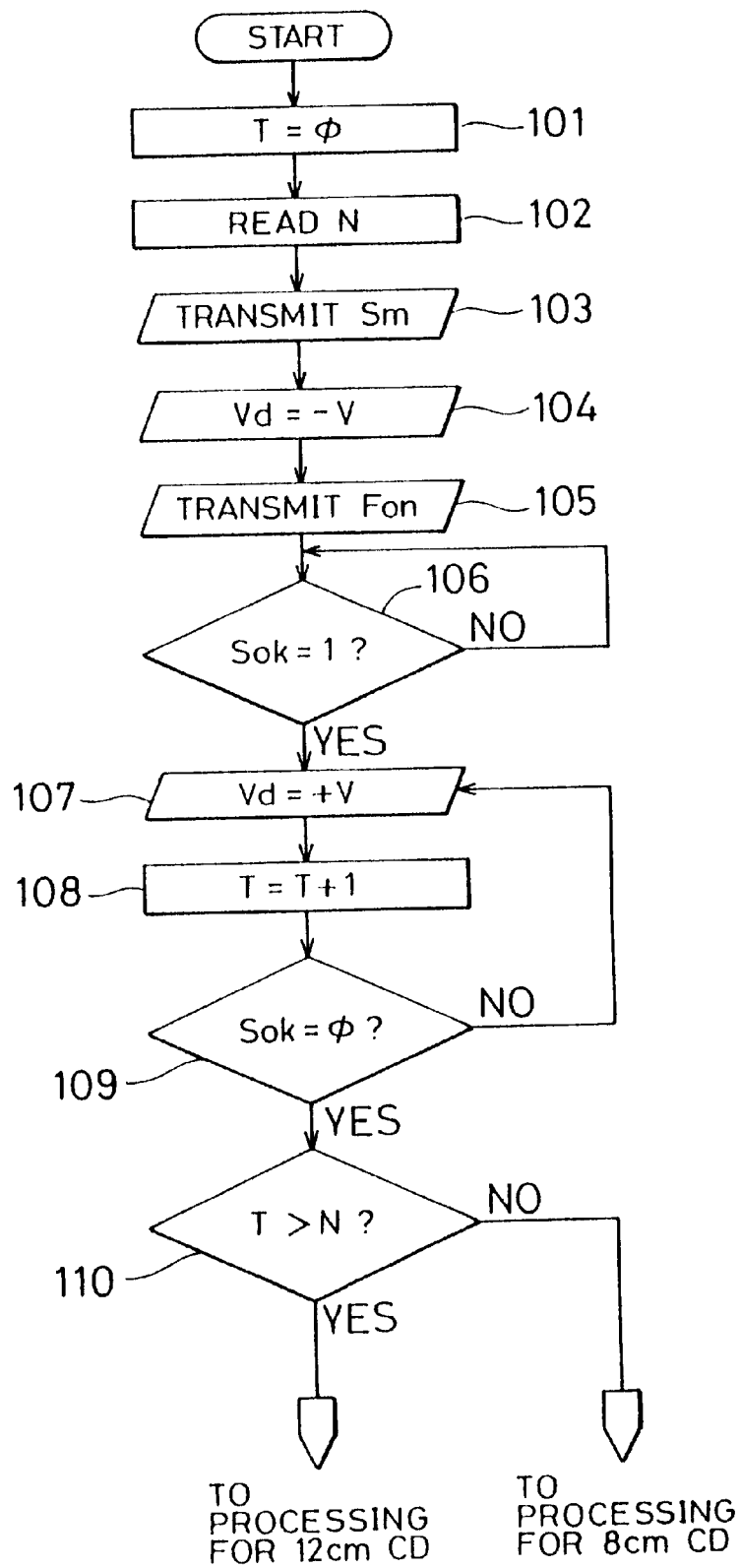
FIG. 4 is a flowchart of an operation of the information recorded disk reproducing apparatus of the first embodiment.

The information recorded disk reproducing apparatus of the first embodiment having a hardware structure as described above is processed along the flowchart shown in FIG. 4. The processing will hereinafter be described to disclose the internal software processing of the microprocessor 9.

First, as the initialization of the microprocessor 9, a value T of a software counter lising an incorporated random access memory is cleared to 0 at step 101. Then, by the count value T, a discrimination value N for discriminating the diameter of the CD 1 is read out from a read only memory area (hereinafter, referred to as "ROM") and the value N is set at step 102. Then, to rotate the motor 2, the motor activation signal Sm is transmitted to the motor controlling circuit 10 at step 103 to rotate the CD 1 at a constant speed. The above is the initialization.

Then, at step 104, in order to move the reproducing head 3 to the innermost track of the CD 1, a data Vd is transmitted to the D/A of the microprocessor 9 and a voltage −V is generated from the output port DA. Consequently, the moving stand 4a moves to the innermost track of the CD 1 and abuts a mechanical stopper to be on standby.

Then, at step 105, the focus control start command Fon is transmitted to the focus controlling circuit 6 to search for a focus position. Then, at step 106, the discrimination signal Sok is monitored and the search for the focus position is repeated until the logic state becomes "1" which means in-focus state.

When it is confirmed that in-focus state is obtained, the process proceeds to step 107 to change the driving command voltage Vd to a voltage +V. Consequently, the moving stand 4a starts to move toward the outermost track of the CD 1 at a constant speed. Together with this processing, a processing to increment the cleared value T by 1 is performed at step 108. Thereafter, at step 109, the discrimination signal Sok is monitored again and the process waits until the logic state becomes 0, i.e. until the focus control is canceled. The processings of steps 107, 108 and 109 constitute a software counter which constitutes a counting means by counting how many times the processings are performed based on the value T.

Since the reproducing head 3 is moved by the transporting means 4 at a constant speed as described above, the value T is proportional to the time to the cancellation of the focus control, i.e. the radius of the CD 1 The discrimination value N of the case of an 8 cm CD is supplied from a ROM as described above since it can be calculated in advance from the movement speed of the reproducing head 3 end the processing time of the counting means. The discrimination value N and the value T are compared with each other at step 110 to discriminate the diameter of the CD attached to the apparatus.

After the discrimination, for example when the diameter of the CD 1 is 8 cm, the apparatus is set in a mode appropriate for reproducing an 8 cm CD. With this, the series of processings of this embodiment is completed.

While the reproducing head 3 is moved by the transporting means 4 from the innermost track toward the outermost track in the above-described embodiment, the reproducing head 3 may be moved to the outermost track at the activation of the apparatus and then, moved toward the innermost track at a constant speed. In this case, step 106 to confirm the setting of the focus control is deleted from the initialization processing and the sign of the data Vd at steps 104 and 107 is reversed. While the counting means is described as a software counter, the time counting may be performed by means of hardware, for example by using a timer counter incorporated in the microprocessor 9.

As described above, according to this embodiment, the reproducing head used for reproducing information is moved to the innermost track in advance and to discriminate the radius of the CD, the time to the cancellation of the focus control is counted while the reproducing head 3 is being moved toward the outermost track of the CD at a constant speed, so that it is unnecessary to add a cost increasing extra part for detecting the radius. As a result, the reduction in cost and size is facilitated.

Figure 5:
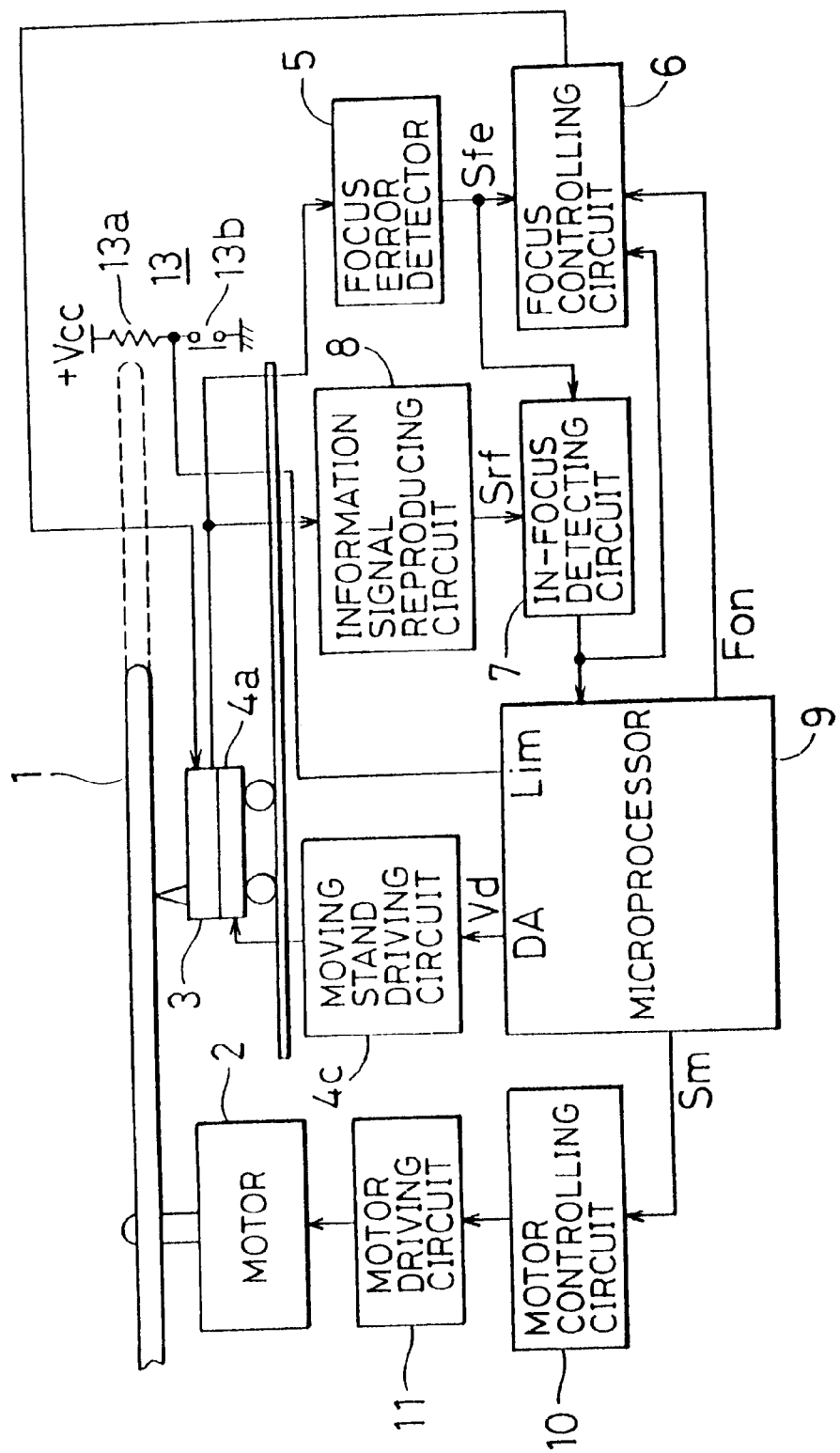
FIG. 5 is a schematic block diagram of an information recorded disk reproducing apparatus of a second embodiment of the present invention.

Referring to FIG. 5, there is shown a schematic block diagram of an information recorded disk reproducing apparatus of a second embodiment of the present invention. Peripheral hardware of this embodiment will not be described in detail since it is different from that of the first embodiment only in that an outermost track limiting switch 13 including a pull-up resistor 13a and a switch 13b is, added at a position 6 cm away from the center of rotation of the motor along its radius and that an output of the switch 13 is coupled to a port Lim of the microprocessor 9.

Figure 6:
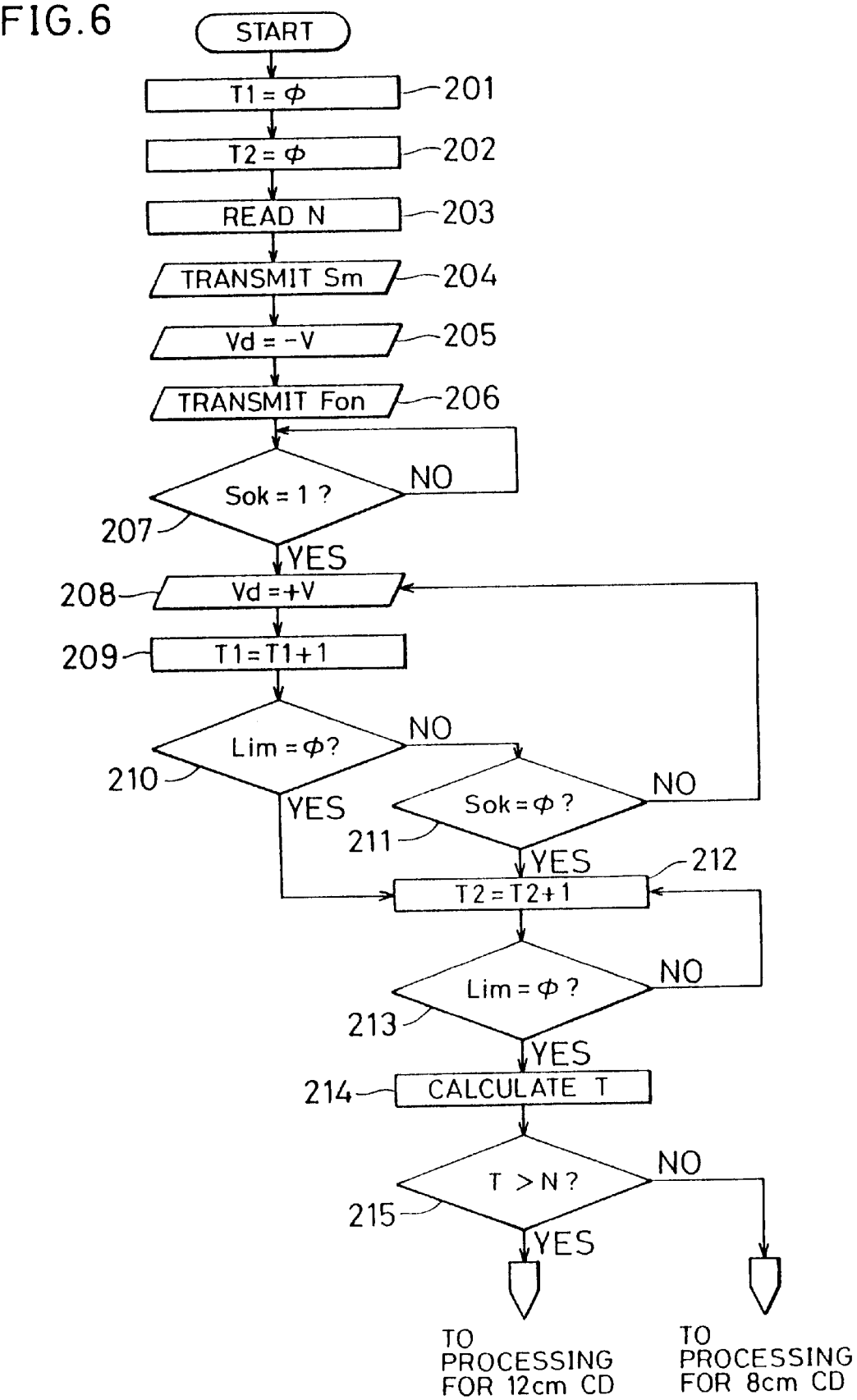
FIG. 6 is a flowchart of an operation of the information recorded disk reproducing apparatus of the second embodiment.

The information recorded disk reproducing apparatus of the second embodiment having a hardware structure as described above is processed along the flowchart shown in FIG. 6. The processing will hereinafter be described to disclose the internal software processing of the microprocessor 9.

First, as the initialization of the microprocessor 9, a value T1 of a first software counter using an incorporated random access memory and a value T2 of a second software counter are cleared to 0 at steps 201 and 202, respectively Then, by the count values T1 and T2, the discrimination value N for discriminating the diameter of the CD 1 is read out from a ROM and the value N is set at step 203. Then, to rotate the motor 2, the motor activation signal Sim is transmitted to the motor controlling circuit 10 at step 204 to rotate the CD 1 at a constant speed. The above is the initialization.

Then, at step 205, in order to move the reproducing head 3 to the innermost track of the CD 1, the data Vd is transmitted to the D/A incorporated in the microprocessor 9 and a voltage −V is generated from the output port DA. Conseqcuently, the moving stand 4a moves to the innermost track of the CD 1 and abuts a mechanical stopper to be on standby.

Then, at step 206, the focus control start command Fon is transmitted to the focus controlling circuit 6 to search for a focus position Then, at step 207, the discrimination signal Sok is monitored and the search for the focus position is repeated until the logic state becomes "1" which means in-focus state.

When it is confirmed that in-focus state is obtained, the process proceeds to step 208 to change the driving command voltage Vd to a voltage +V. Consequently, the moving stand 4a starts to move toward the outermost track of the CD 1 at a constant speed. Together with this processing, a processing to increment the cleared value T1 by 1 is performed at step 209. Then, whether the outermost track limiting switch 13 is depressed or not is determined at step 210 and the discrimination signal Sok is monitored at step 211, and the process waits until the logic state becomes 0, i.e. until the focus control is canceled. The processings of steps 208, 209, 210 and 211 constitute a software counter which constitutes a counting means for counting how many times the processings are performed based on the value T1.

When it is detected at step 210 that the outermost track limiting switch 13 is turned on by being depressed by the moving stand 4a while the first counting means is operating, the process proceeds to step 212. Then, the second value T2 is incremented by 1 at step 212 and the next step 213 is executed. At this time, since the outermost track limiting switch 13 is ON as described above, step 213 is skipped and the process proceeds to step 214.

When it is detected that the outermost track limiting switch 13 is not turned on, a second software counter constituted by steps 212 and 213, i.e. a second counting means is constituted Thereby, the value T2 is incremented until the outermost track limiting switch 13 is depressed. After the switch 13 is depressed, the process proceeds to step 214.

At step 214, a ratio T of the value T1 to the value T2 is calculated. By using the result, the diameter of the CD 1 is discriminated at step 215. Since the reproducing head 3 is moved at a constant speed by the transporting means 4 as described previously, the value T corresponds to the time to the cancellation of the focus control, i.e. the radius of the CD 1. The discrimination value N of the case of an 8 cm CD is supplied from a ROM as described previously since it can be calculated in advance from the movement speed of the reproducing head 3 and the processing time of the counting means. The discrimination value N and the value T are compared with each other at step 215 to discriminate the diameter of the CD attached to the apparatus.

After the discrimination, for example when the diameter of the CD 1 is 8 cm, the apparatus is set in a mode appropriate for reproducing an 8 cm CD. With this, the series of processings of this embodiment is completed.

While the reproducing head 3 is moved by the transporting means 4 from the innermost track toward the outermost track in the above-described second embodiment, the reproducing head 3 may be moved to the outermost track at the activation of the apparatus and then, moved toward the innermost track at a constant speed. While the counting means is described as a software counter, the time counting may be performed by means of hardware, for example by using a timer counter incorporated in the microprocessor 9.

As described above, according to this embodiment, the reproducing head used for reproducing information is moved to the innermost track in advance, the time to the cancellation of the focus control and the time required for the reproducing head 3 to reach the outermost track are counted while the reproducing head 3 is being moved toward the outermost track of the CD at a constant speed, and the radius of the CD is discriminated from the ratio between the values, so that it is unnecessary to add a cost increasing extra part for detecting the radius. As a result, the reduction in cost and size is facilitated.

Figure 7:
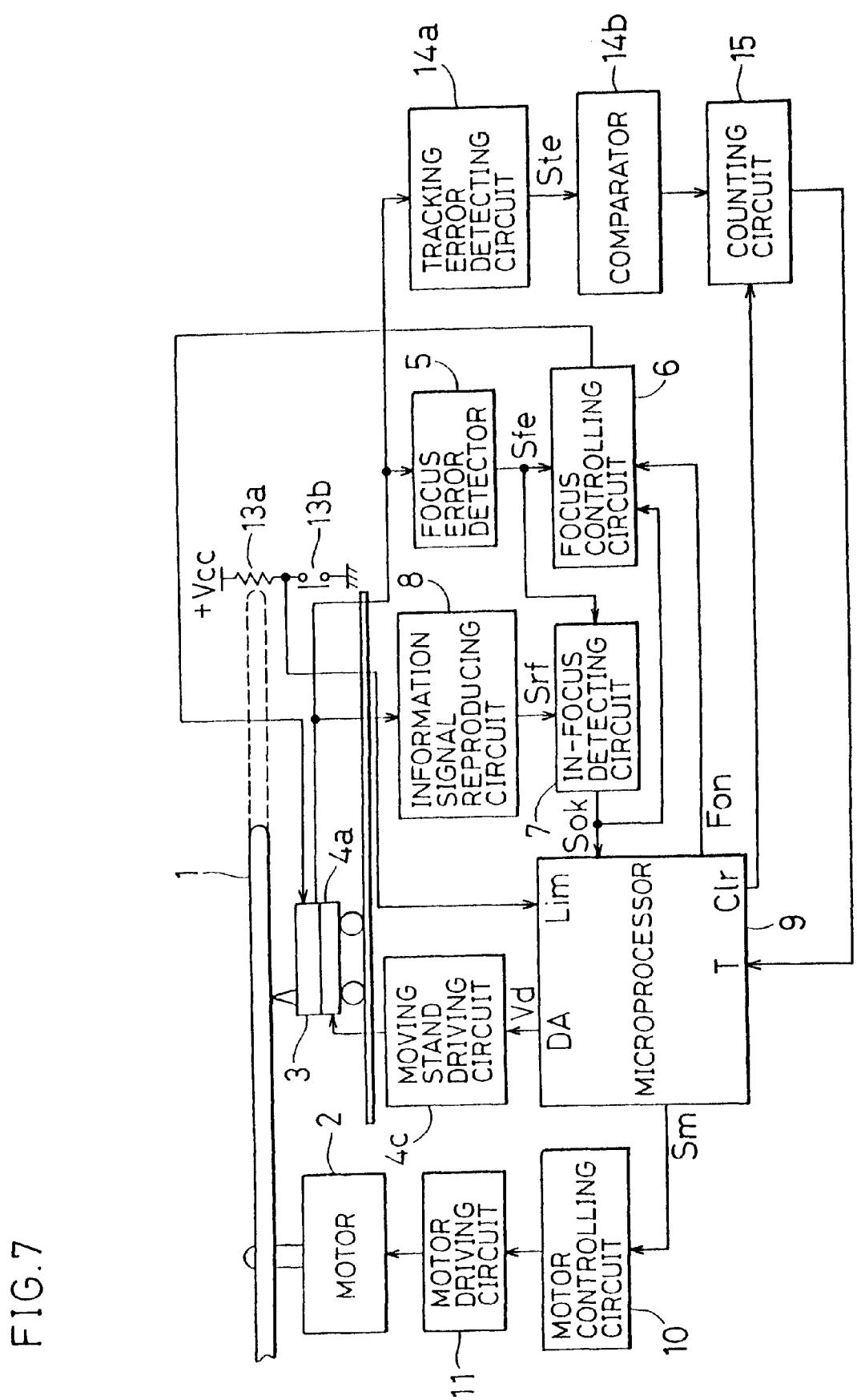
FIG. 7 is a schematic block diagram of an information recorded disk reproducing apparatus of a third embodiment of the present invention.

Referring to FIG. 7, there is shown a schematic block diagram of an information recorded disk reproducing apparatus of a third embodiment of the present invention. Peripheral hardware of this embodiment will not be described in detail since it is different from that of the second embodiment only in that a tracking error detecting circuit 14a, a comparator 14b and a counting circuit 15 are added.

On the CD 1, a circinate information track as shown at la of FIG. 2 is formed from the innermost track to the outermost track with a pitch of approximately 1.6 μm. For this reason, the information track can be regarded substantially as a concentric circle for the reproducing head 3. To cause the objective lens 3b to follow such a high density information track, a mechanism called a tracking control is used. An optical means for detecting a tracking error signal Ste used for the tracking control is incorporated in the reproducing head 3. As methods of such a tracking error detection, a three beam method, a push-pull method and a phase difference method are known. These will not be described in detail since they are all known methods.

Figure 8:
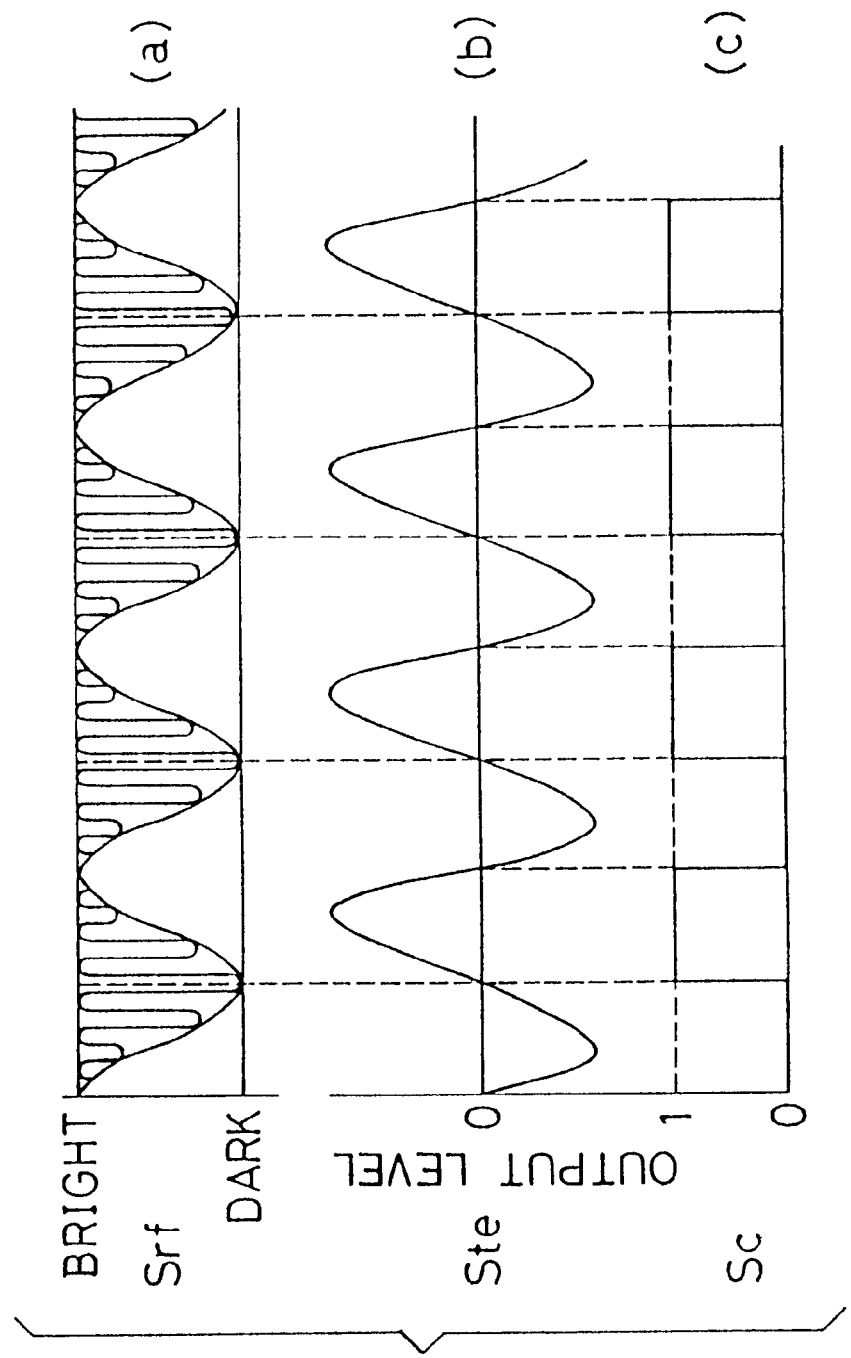
FIG. 8(a–c) shows waveforms of a high-frequency signal, a tracking error signal and a track crossing signal of the third embodiment.

When the reproducing head 3 is in focus, the tracking error signal Ste obtained by such a tracking error detecting method has a waveform as shown in (b) of FIG. 8 and the relationship with the high-frequency signal Srf shown in (a) of FIG. 8 is as shown in the figure. The tracking error signal Ste is transmitted to the comparator 14b, binarized at a position where it crosses a zero potential point representative of a just-on-track point, and output as a track crossing signal Sc as shown in (c) of FIG. 8. The number of tracks is counted, for example, by counting the number of fall edges of the track crossing signal Sc by a counting circuit 16 and the result is transmitted to the microprocessor 9. The start of the counting operation is controlled by a clearing signal Clr transmitted from a port Clr of the microprocessor 9.

Figure 9:
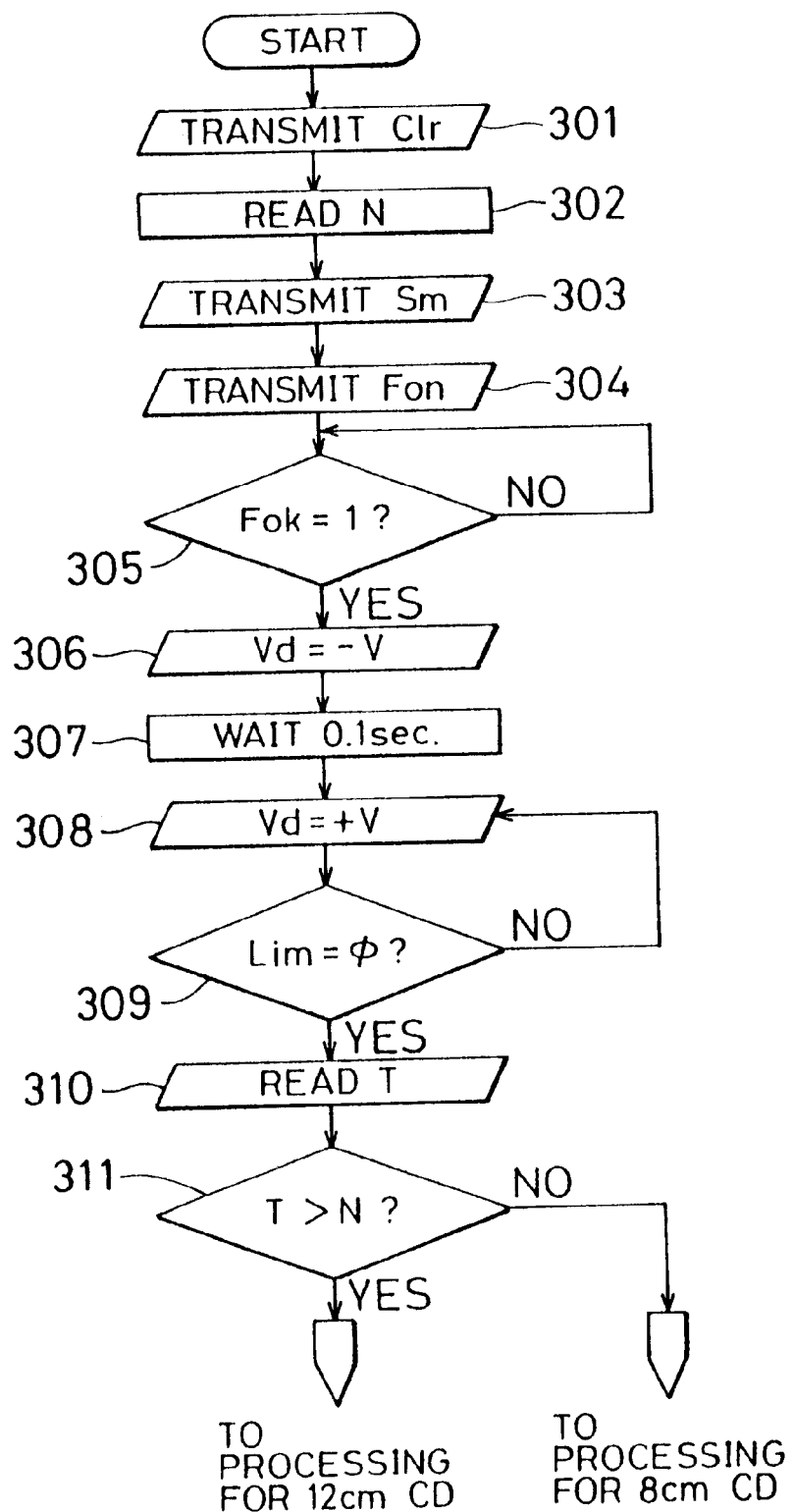
FIG. 9 is a flowchart of an operation of the information recorded disk reproducing apparatus of the third embodiment.

The information recorded disk reproducing apparatus of the third embodiment having a hardware structure as described above is processed along the flowchart shown in FIG. 9. The processing will hereinafter be described to disclose the internal software processing of the microprocessor 9.

First, as the initialization of the microprocessor 9, at step 301, to set an internal value T of the counting circuit 16 to 0, the clearing signal Clr is transmitted from the port Clr to clear the counting circuit 16. Then, at step 302, the count value T of the counting circuit 15 is read in and the discrimination value N for discriminating the diameter of the CD 1 is read out from the ROM. Then, to rotate the motor 2, the motor activation signal Sm is transmitted to the motor controlling circuit 10 at step 303 to rotate the CD 1 at a constant speed.

Then, at step 304, the focus control start command Fon is transmitted to the focus controlling circuit 12 to search for a focus position. Then, at step 305, the discrimination signal Sok is monitored and the search for the focus position is repeated until the logic state becomes "1" which means in-focus state. The above is the initialization.

When it is confirmed that in-focus state is obtained, the process proceeds to step 306 to change the driving command voltage Vd to a voltage −V. Consequently, the moving stand 4a moves toward the innermost track of the CD 1 Then, at step 307, the process waits until the moving stand 4a sufficiently reaches the innermost track, and at step 308, the driving command voltage Vd is changed to +V. Consequently, the moving stand 4a starts to move toward the outermost track of the CD 1 at a constant speed. At this time, the track crossing signal as shown in FIG. 8 is added to the counting circuit 16 to increase the internal value T. These operations are repeated at step 309 until the outermost track limiting switch 13 is depressed.

An outermost track detecting signal Lim is changed to 0 by the depression of the outermost track limiting switch 13 by the moving stand 4a, and the process proceeds to step 310 to load the count value T of the counting circuit 16 in an internal register of the microprocessor 9.

Since the number of track crossing signals Sc generated substantially every predetermined pitch is counted as described above, the value T is proportional to the radius of the CD 1. The discrimination value N of the case of an 8 cm CD is supplied from a ROM as described above since it can be calculated in advance from the pitch of the information track. The discrimination value N and the value T are compared with each other at step 311 to discriminate the diameater of the CD attached to the apparatus.

After the discrimination, for example when the diameter of the CD 1 is 8 cm, the apparatus is set in a mode appropriate for reproducing an 8 cm CD. With this, the series of processings of this embodiment is completed.

While the reproducing head 3 is moved by the transporting means 4 from the innermost track toward the outermost track in the above-described second embodiment, the reproducing head 3 may be moved to the outermost track at the activation of the apparatus and then, moved toward the innermost track at a constant speed. While the counting means is described as a hardware counter, the time counting may be performed by means of software, for example by generating an interrupt every edge of the track crossing signal Sc by using an interrupt processing incorporated in the microprocessor 9.

As described above, according to this embodiment, the reproducing head used for reproducing information is moved to the innermost track in advance, the radius of the CD is discriminated by counting the number of crossed tracks while the reproducing head 3 is being moved toward the outermost track of the CD at a constant speed, so that it is unnecessary to add a cost increasing extra part for detecting the radius. As a result, the reduction in cost and size is facilitated.

Figure 10:
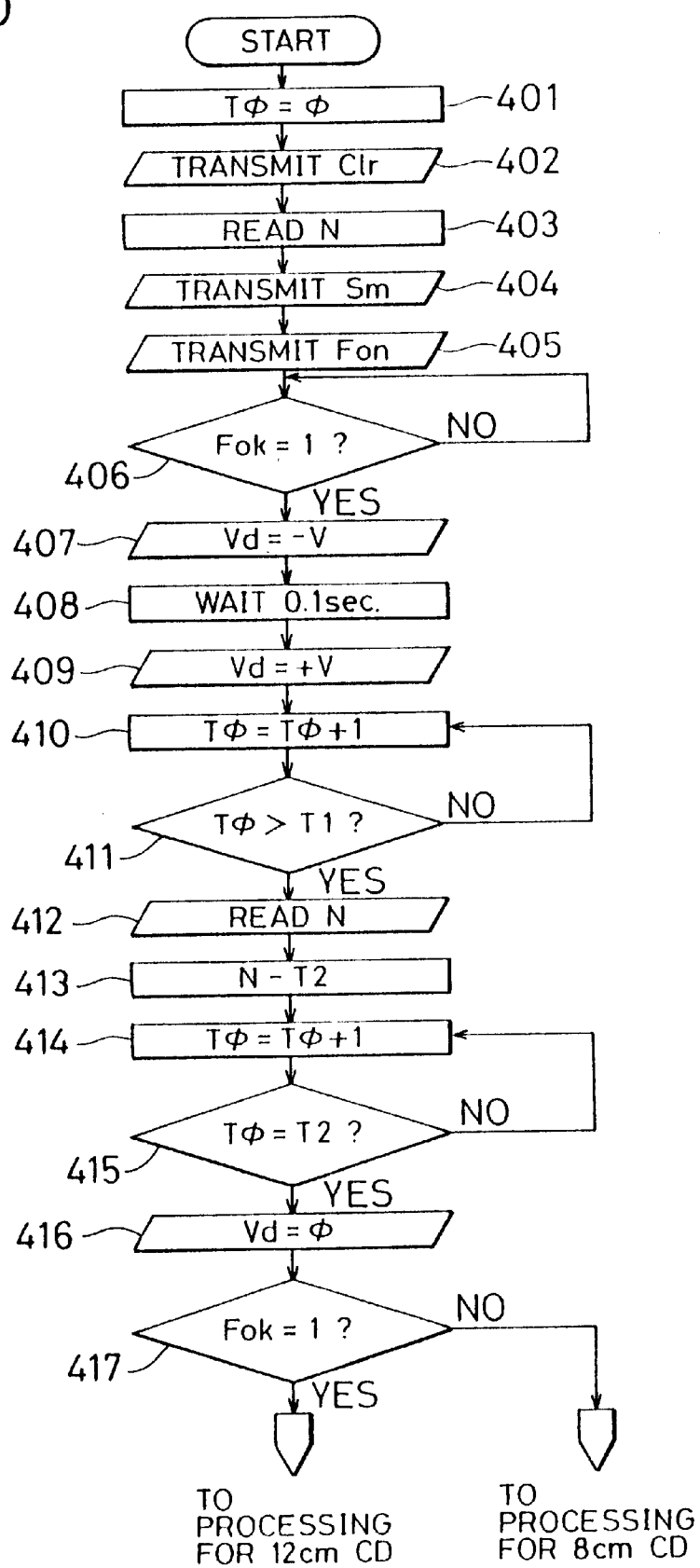
FIG. 10 is a flowchart of an operation of an information recorded disk reproducing apparatus of a fourth embodiment of the present invention.

Referring to FIG. 10, there is shown a flowchart of an information recorded disk reproducing apparatus of a fourth embodiment of the present invention. Peripheral hardware of this embodiment will not be described in detail since it is the same as that of the third embodiment. Its processing will hereinafter be described to disclose the internal software processing of the microprocessor 9.

In this embodiment, first, an internal counter T0 is cleared at step 401. Steps 402 to 408 subsequent thereto including the initialization will not be described in detail since they are the same as steps 301 to. 307 of the third embodiment.

At step 409, the driving command voltage Vd is changed to +V. Consequently, the moving stand 4a starts to move toward the outermost track of the CD 1 at a constant speed. At this time, the track crossing signal as shown in FIG. 8 is added to the counting circuit 16 to increase the internal value N. At this time, the time counting is performed by a timer constituted by a software counter constituted by steps 410 and 411. These operations are repeated until the value of the timer reaches a target value T1. During this time, the counting circuit 16 counts the number of information tracks crossed by a light beam output by the reproducing head 3. The time of the counting by the timer is approximately 10 seconds.

When the above-mentioned time is reached, the count value output by the counting circuit 16 is input to the microprocessor 9 at step 412. Since the pitch of the information track is constant, the value T is proportional to the movement speed of the moving stand 4a. Consequently, a movement speed T2 required for the reproducing head 3 to reach the position of the innermost track of an 8 mm CD can be calculated. When the diameter of the inner most track is D0 and the diameter of the outermost track is D1, the movement time T2 is given by the following expression:

$$T2 = K \cdot \frac{D1 - D0}{N}$$

where K is a constant.

Since the calculation by the above expression is sometimes disadvantage in view of time if performed by means of software, a table for subtracting T2 from N corresponding to the above expression is formed in the ROM. At step 412, such a subtraction is performed. Such a processing can be performed with one command even in the case of an assembler level language.

Since the movement time T2 required for the reproducing head 3 to reach the position of the outermost track of an 8 cm CD at the current movement speed of the moving stand 4a has been calculated by the above-described processing, the remaining time is calculated by a software counter constituted by steps 413 and 414. Thereby, when the moving steand 4a reaches the position of the outermost track of an 8 cm CD, the driving command voltage Vd is changed to 0 V at step 415. Consequently, the moving stand 4a stops at the position of the outermost track of an 8 cm CD.

At this time, the discrimination signal Sok is monitored at step 417. When the focus control is ON, ide. when the logic state of the discrimination signal Sok is 1, the diameter of the CD attached at that time is determined to be 12 cm. Otherwise, the diameter is determined to be 8 cm.

After the discrimination, for example when the diameter of the CD 1 is 8 cm, the apparatus is set in a mode appropriate for reproducing an 8 cm CD. With this, the series of processings of this embodiment is completed.

While the counting means is described as a hardware counter in the above-described embodiment, for example, an interrupt may be applied at every edge of the track crossing signal Sc by using an interrupt processing incorporated in the microprocessor 9 to count the number of interrupts by means of software.

As described above, according to this embodiment, the reproducing head used for reproducing information is moved to the innermost track in advance, the radius of the CD is discriminated by calculating the time for the reproducing head 3 to reach the outermost track while the reproducing head 3 is being moved toward the outermost track of the CD substantially at a constant speed and by determining whether or not the focus control is applied outside the position of the outermost track of an 8 cm CD, so that it is unnecessary to add a cost increasing extra part for detecting the radius. As a result, the reduction in cost and size is facilitated.

Figure 11:
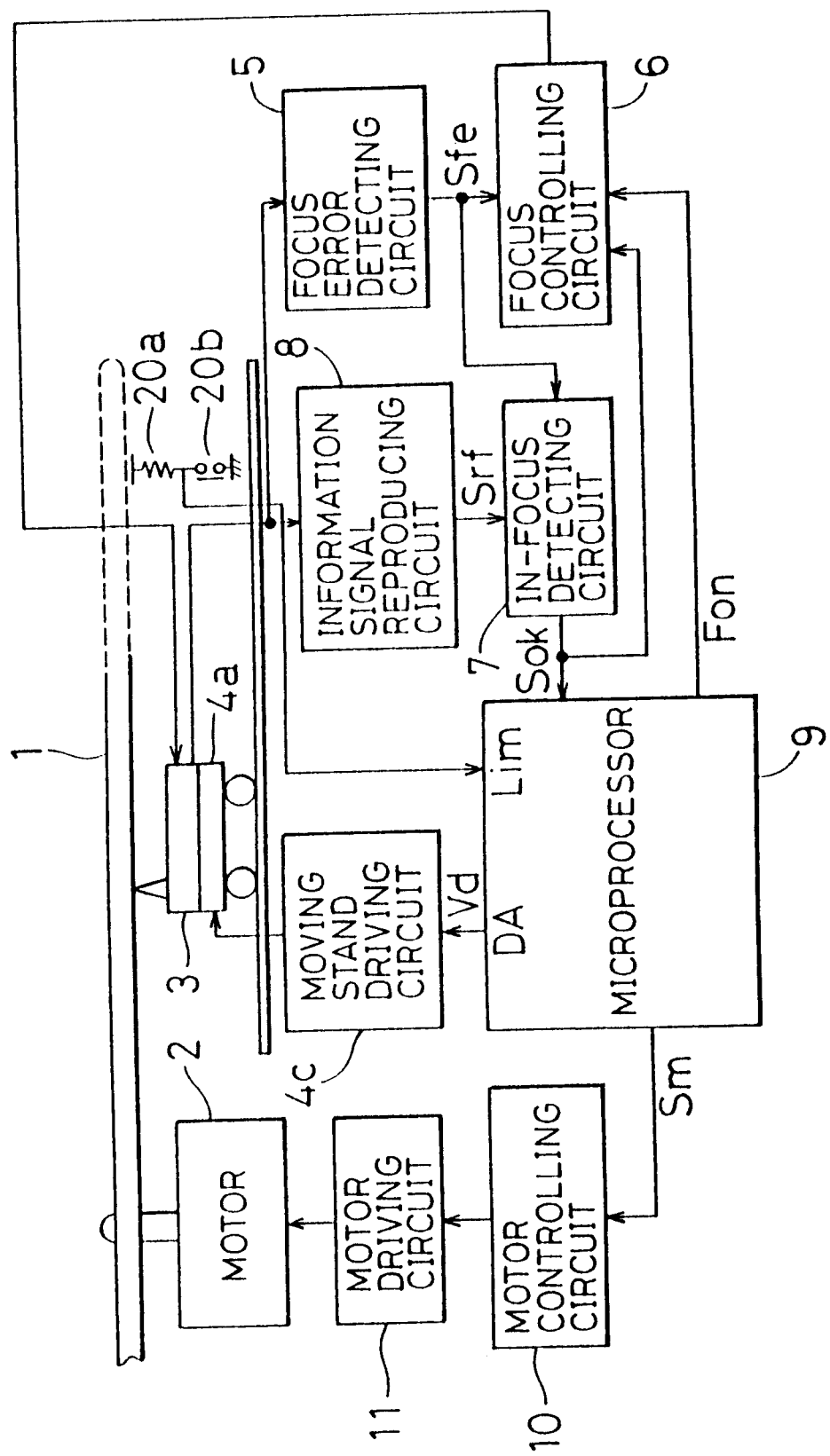
FIG. 11 is a schematic block diagram of an information recorded disk reproducing apparatus of a fifth embodiment of the present invention.

Referring to FIG. 11, there is shown a schematic block diagram of an information recorded disk reproducing apparatus of a fifth embodiment of the present invention. Peripheral hardware of this embodiment will. not be described in detail since it is different from that of the first embodiment only in that an output of a detection switch 20 constituted by a pull-up resistor 20a and a switch 20b arranged 4 cm away from the center of rotation of the motor is coupled to the port Lim of the microprocessor 9.

Figure 12:
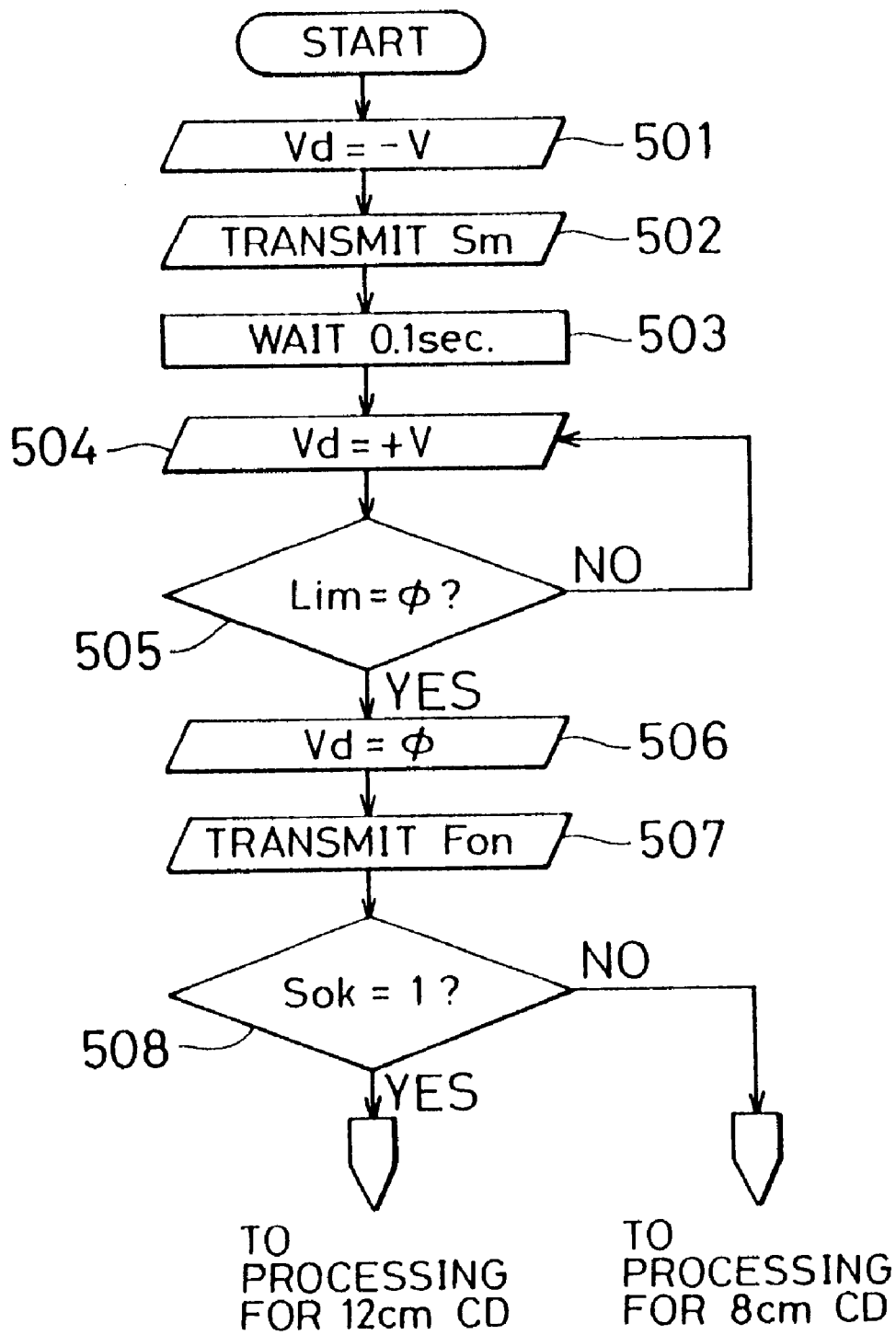
FIG. 12 is a flowchart of an operation of the information recorded disk reproducing apparatus of the fifth embodiment.

The information recorded disk reproducing apparatus of the fifth embodiment having a hardware structure as described above is processed along the flowchart shown in FIG. 12. The processing will hereinafter be described to disclose the internal software processing of the microprocessor 9.

First, as the initialization of the microprocessor 91 the driving command voltage Vd is changed to −V at step 501. Consequently, the moving stand 4a is moved toward the innermost track of the CD 1 Then, to rotate the motor 2, the motor activation signal Sm is transmitted to the motor controlling circuit 10 at step 502 to rotate the CD 1 at a constant speed. The above is the initialization.

Then, at step 503, the proceses waits until the moving stand 4a sufficiently reaches the innermost track, and at step 504, the driving command voltage Vd is changed to +V. Consequently, the moving stand 4a starts to move toward the outermost track of the CD at a constant speed. This operation is repeated at step 505 until the detection switch 20 is depressed so that the logic state of the signal Lim becomes 0.

When the detection switch 20 is depressed, i.e. when the moving stand 4a reaches the position of the outermost track of an 8 cm CD, the driving command voltage Vd is changed to 0 V at step 506. Consequently, the moving stand 4a stops at the position of the outermost track of an 8 cm CD.

At this position of the moving stand 4a, at step 507, the focus control start command signal Fon is transmitted to the focus controlling circuit 12 to search for the focus position. Then, at step 508, the discrimination signal Sok is monitored and whether or not the logic state is "1" which means in-focus state is determined. When the logic state is "1", the diameter of the CD is determined to be 12 cm. Otherwise the diameter is determined to be 8 cm.

After the discrimination, for example when the diameter of the CD 1 is 8 cm, the apparatus is set in a mode appropriate for reproducing an 8 cm CD. With thick, the series of processings of this embodiment is completed.

As described above, according to this embodiment, the reproducing head used for reproducing information is moved to the vicinity of the innermost track in advance, and the radius of the CD is discriminated by determining whether the focus control is applied or not, so that it is unnecessary to add a cost increasing extra part for detecting the radius. As a result, the reduction in cost and size is facilitated.

Figure 13:
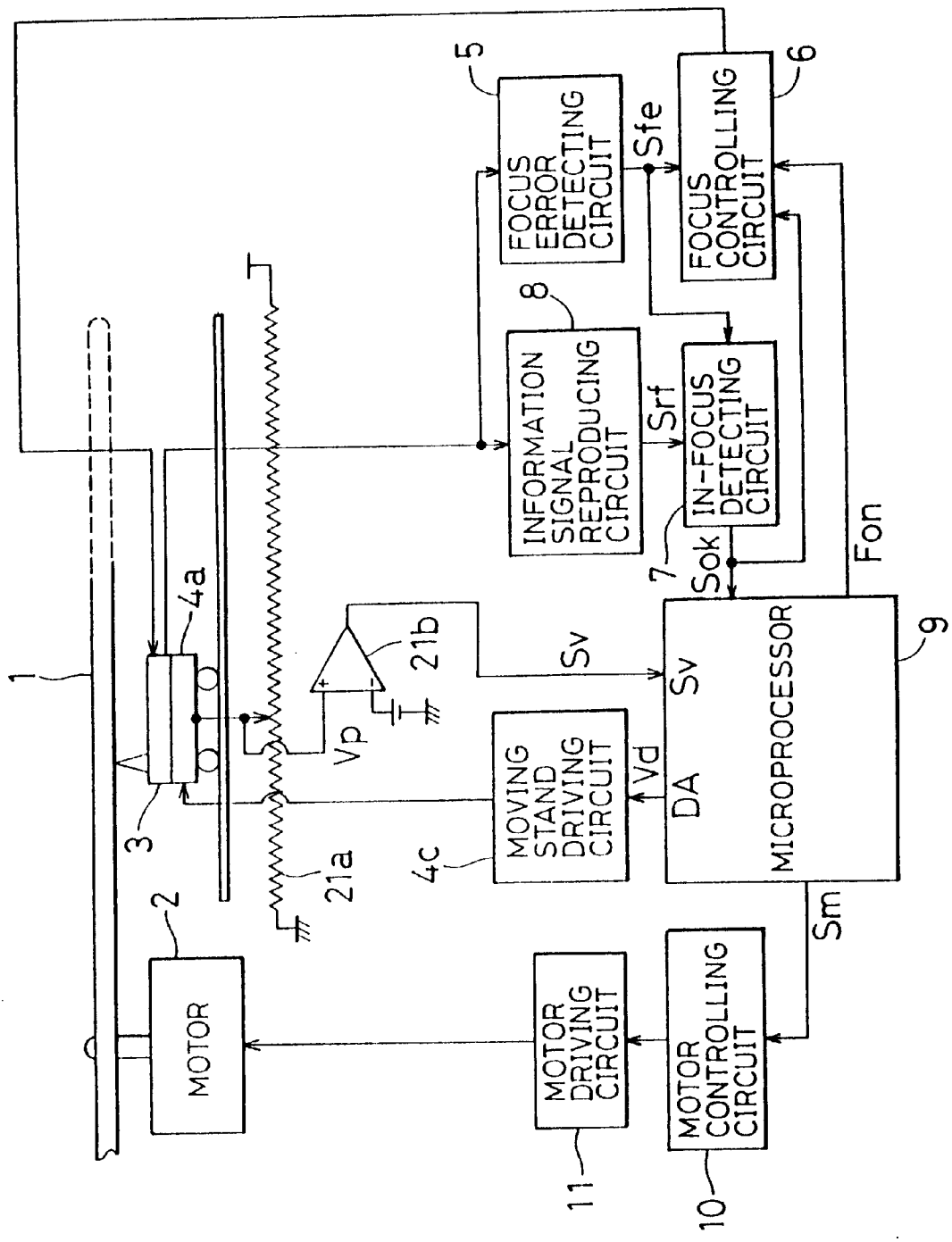
FIG. 13 is a schematic block diagram of an information recorded disk reproducing apparatus of a sixth embodiment of the present invention.

Referring to FIG. 13, there is shown a schematic block diagram of an information recorded disk reproducing apparatus of a sixth embodiment of the present invention. Peripheral hardware of this embodiment will not be described in detail since it is different from that of the first embodiment only in that a sliding variable resistor 21a having its moving portion mechanically connected to the moving stand 4a, and a comparator 21b are added.

A constant voltage is applied to the variable resistor 21a to take a voltage signal Vp linearly proportional to the position of the moving stand 4a. The voltage signal Vp and a voltage substantially the same as a voltage appearing when the moving stand 4a is located 4 cm away from the center of rotation of the motor 2 are compared by the comparator 21b. When the voltage signal Vp is equal to or higher than the set voltage, a detection signal Sv representative of the logic state of "1" is output. The signal Sv is input to a port Sv of the microprocessor 9.

Figure 14:
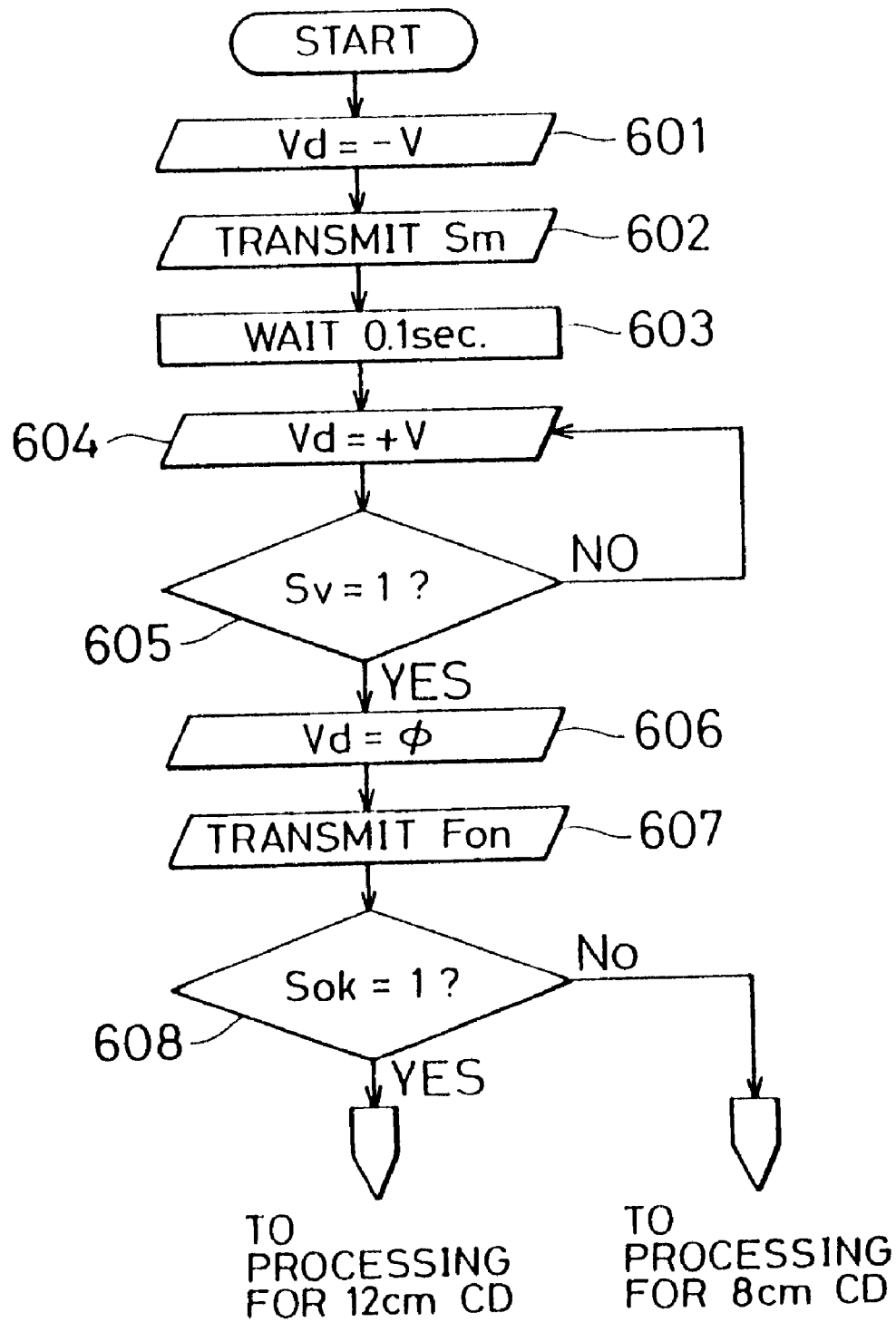
FIG. 14 is a flowchart of an operation of the information recorded disk reproducing apparatus of the sixth embodiment.

The information recorded disk reproducing apparatus of the sixth embodiment having a hardware structure as described above is processed along the flowchart shown in FIG. 14. The processing will hereinafter be described to disclose the internal software processing of the microprocessor 9.

Steps 601 to 603 of this embodiment including the initialization of the microprocessor 9 will not be described in detail since they are the same as steps 501 to 503 of the fifth embodiment.

The moving stand 4a is moved toward the outermost track of the CD 1 at a constant speed and this is repeated at step 605 until the logic state of the detection signal Sv becomes "1". The processing subsequent thereto will not be described in detail since it is the same as that of the fifth embodiment.

After the discrimination, for example when the diameter of the CD 1 is 8 cm, the apparatus is set in a mode appropriate for reproducing an 8 cm CD. With this, the series of processings of this embodiment is completed.

As described above, according to this embodiment, the reproducing head used for reproducing information is moved to the vicinity of the innermost track in advance, and the radius of the CD is discriminated by determining whether the focus control is applied or not, so that it is unnecessary to add a cost increasing extra part for detecting the radius. As a result, the reduction in cost and size is facilitated.

While the information recorded disk is described as a CD in the above-described embodiments, the embodiments are all employable for LDs by using different values of diameters.

While the moving stand is driven by the VCM, it may be driven through a screw by a stepping motor or by a typical direct current motor. In that case, in the sixth embodiment, the radius is easily detected from the angle of rotation by using a rotary variable resistor or a rotary encoder instead of the sliding variable resistor. Thus, the present invention can be embodied and modified in various ways.

Obviously, many modifications and variations of the present invention are possible in light of the above teachings it is therefore to be understood that within the scope of the appended claims, the invention may be practiced other than as specifically described.

What is claimed is:

1. An information recorded disk reproducing apparatus comprising:

a reproducing head which irradiates a light beam to an optically reproducible information recorded disk on which substantially concentric tracks are recorded, said reproducing head receiving a light beam reflected by the disk;

means for receiving an output of the reproducing head to output a track crossing signal every time the reproducing head crosses the track;

transporting means for moving the reproducing head to one of an innermost portion or an outermost portion of the information recorded disk in advance at a time of activation and then moving the reproducing head toward the other of the outermost portion or the innermost portion of the head possible by the transporting means at a predetermined constant speed;

counting means for counting the number of track crossing signals; and means for discriminating a radius of the information recorded disk in accordance with at least an output value of the counting means.

* * * * *